(12) United States Patent
Sekidou et al.

(10) Patent No.: US 6,377,439 B1
(45) Date of Patent: Apr. 23, 2002

(54) ELECTRONIC MULTILAYER CERAMIC COMPONENT

(75) Inventors: Hiroshi Sekidou, Takefu; Yoshikazu Takagi, Sabae; Yasunobu Yoneda, Takefu, all of (JP)

(73) Assignee: Murata Manufacturing, Co. (JP)

( * ) Notice: Subject to any disclaimer, the term of this patent is extended or adjusted under 35 U.S.C. 154(b) by 0 days.

(21) Appl. No.: 09/615,651

(22) Filed: Jul. 13, 2000

(30) Foreign Application Priority Data

Jul. 15, 1999 (JP) .......................... 11-202039

(51) Int. Cl.$^7$ .............................. H01G 4/005
(52) U.S. Cl. ................. 361/303; 361/306.3; 361/321.2; 428/210
(58) Field of Search .................. 428/210; 361/303, 361/306.3, 311, 312, 313, 320, 321.1–321.5

(56) References Cited

U.S. PATENT DOCUMENTS

| | | | | |
|---|---|---|---|---|
| 4,430,689 A | * | 2/1984 | Lagrange et al. | 361/321 |
| 4,906,512 A | * | 3/1990 | Roess | 428/192 |
| 6,014,309 A | * | 1/2000 | Ueno et al. | 361/306.3 |
| 6,128,177 A | * | 10/2000 | Titulaer et al. | 361/305 |
| 6,160,472 A | * | 12/2000 | Arashi et al. | 338/21 |

* cited by examiner

*Primary Examiner*—Cathy Lam
(74) *Attorney, Agent, or Firm*—Ostrolenk, Faber, Gerb & Soffen, LLP

(57) ABSTRACT

An electronic multilayer ceramic component is disclosed which is less susceptible to having a crack or delamination in a sintered ceramic block and has high thermal shock resistance, high humidity resistance, and high reliability. Dimensional parameters EW, WG, T, and G of the electronic multilayer ceramic component are determined such that the following conditions are satisfied: WG/EW≧0.3; and T/G≦7.0, where EW is the width of inner electrodes, WG is the width of a side gap region between the ends of the inner electrodes and one of side faces of a sintered ceramic block, T is the thickness of a region in which the plurality of inner electrodes are laminated, and G is the thickness of one of the outermost ceramic layers parallel to the plurality of inner electrodes and located outside the region in which the plurality of inner electrodes are laminated.

5 Claims, 2 Drawing Sheets

ELECTRONIC MULTILAYER CERAMIC COMPONENT

BACKGROUND OF THE INVENTION

1. Field of the Invention

The present invention relates to an electronic multilayer ceramic component such as a multilayer capacitor, and more particularly to an electronic multilayer ceramic component in which the relationship between the size of a region in which inner electrodes are disposed in a multilayer fashion and the size of a part located outside that region is optimized.

2. Description of the Related Art

Electronic multilayer ceramic components, such as a multilayer capacitors are becoming increasingly smaller. Electronic multilayer ceramic components are constructed such that a plurality of inner electrodes are embedded in a sintered ceramic block, and outer electrodes are formed on outer side faces of the sintered ceramic block. With the reduction in size of electronic multilayer ceramic components, the size of the sintered ceramic block has become very small. For example, various types of sintered ceramic blocks with sizes smaller than 1.6 mm× 0.8 mm×0.8 mm are commercially available.

In the case of multilayer ceramic capacitors, in order to reduce the size while maintaining the capacitance at a large value, the thickness of ceramic layers between adjacent inner electrodes is selected to be as small as 5 $\mu$m or 3 $\mu$m or still smaller, and as many as several hundred inner electrode layers are used.

FIG. 2 is a cross-sectional view of a conventional multilayer capacitor of the above-described type. As shown in FIG. 2, the multilayer capacitor 51 includes a plurality of inner electrodes 53 disposed in a sintered ceramic block 52 such that the plurality of inner electrodes 53 overlap with one another via ceramic layers. In order to achieve a greater capacitance with a smaller size, various attempts have been made to dispose a greater number of inner electrode layers within a sintered ceramic block with a smaller size.

To this end, the thickness G of outermost ceramic layers 52a and 52b parallel to the inner electrodes and located outside a region in which the plurality of inner electrodes 53 are laminated, is set to be as small as possible. However, if the thickness G of the outermost ceramic layers 52a and 52b is less than 100 $\mu$m, there is a possibility that the outermost ceramic layers 52a and 52b delaminate at an interface with an inner electrode 53 during a sintering process in which ceramic layers are sintered into a single block 52. For the above reason, the lower limit of the thickness of the outermost ceramic layers 52a and 52b is about 100 $\mu$m.

It is also required to minimize the width WG of a side gap region between side ends 53c of the inner electrodes 53 and an end face 52c of the sintered ceramic block 52. To this end, the ratio WG/EW is generally set to a value smaller than 0.3 where EW is the width of each inner electrode 53.

In the conventional multilayer capacitor 51, as described above, in order to obtain a greater capacitance with a smaller size, it has been attempted to minimize the thickness G of the outermost ceramic layers 52a and 52b and also minimize the ratio WG/EW.

However, when the size of the sintered ceramic block 52 is further reduced, if the ratio WG/EW is smaller than 0.3 and if G is set to be about 100 $\mu$m, various problems occur as described below. That is, during the sintering process for obtaining the sintered ceramic block 52, a density difference occurs between a ceramic region in which a plurality of inner electrodes 53 are laminated via ceramic layers and outer ceramic regions, that is, the outermost ceramic layers 52a and 52b. The density difference results in a stress which can produce cracks or delamination in the sintered ceramic block 52.

In a thermal shock test in which multilayer ceramic capacitors are subjected to abrupt temperature changes or in other reliability tests, a crack or delamination occurs in some samples due to the stress caused by the difference in thermal expansion coefficient between the inner electrodes and the ceramic.

Thus, in view of the above problems in the conventional technique, it is an object of the present invention to provide an electronic multilayer ceramic component which is less susceptible to having a crack or delamination and thus has high reliability and high resistance to thermal shock.

SUMMARY OF THE INVENTION

According to an aspect of the present invention, there is provided an electronic multilayer ceramic component comprising: a sintered ceramic block having a first end face, a second end face, upper and lower surfaces connecting said first and second end faces to each other, and a pair of side faces; a plurality of inner electrodes disposed in the sintered ceramic block such that the plurality of inner electrodes overlap in a thickness direction with one another via ceramic layers and such that each inner electrode extends from the first end face toward the second end face but not reaching the second end face or from the second end face toward the first end face but not reaching the first end face; and a first outer electrode and a second outer electrode formed such that the first and second end faces are covered with the first and second outer electrodes, respectively; wherein, when the width of the region in which the plurality of inner electrodes are disposed such that the inner electrodes overlap in the thickness direction with one another via ceramic layers is denoted by EW, the width of a side gap region between ends of the inner electrodes and one of side faces of the sintered ceramic block is denoted by WG, the thickness of a region in which the plurality of inner electrodes are disposed such that the inner electrodes overlap in the thickness direction with one another via ceramic layers is denoted by T, and the thickness of one of the outermost ceramic layers parallel to the plurality of inner electrodes and located outside the region in which the plurality of inner electrodes are disposed such that the inner electrodes overlap in the thickness direction with one another via ceramic layers is denoted by G, the following conditions are satisfied:

$$WG/EW \geq 0.3,$$

and $$T/G \leq 7.0.$$

In the electronic multilayer ceramic component according to the present invention, the sintered ceramic block preferably has a size equal to or less than 1.6 mm in length, 0.8 mm in width, and 0.8 mm in thickness.

Furthermore, in the electronic multilayer ceramic component according to the present invention, the sintered ceramic block may be made of a dielectric ceramic material so that a multilayer capacitor is formed.

Other features and advantages of the present invention will become apparent from the following description of the invention which refers to the accompanying drawings.

DETAILED DESCRIPTION OF EMBODIMENTS OF THE INVENTION

The present invention is described in further detail below with reference to specific embodiments in conjunction with the accompanying drawings.

Figure 1A:
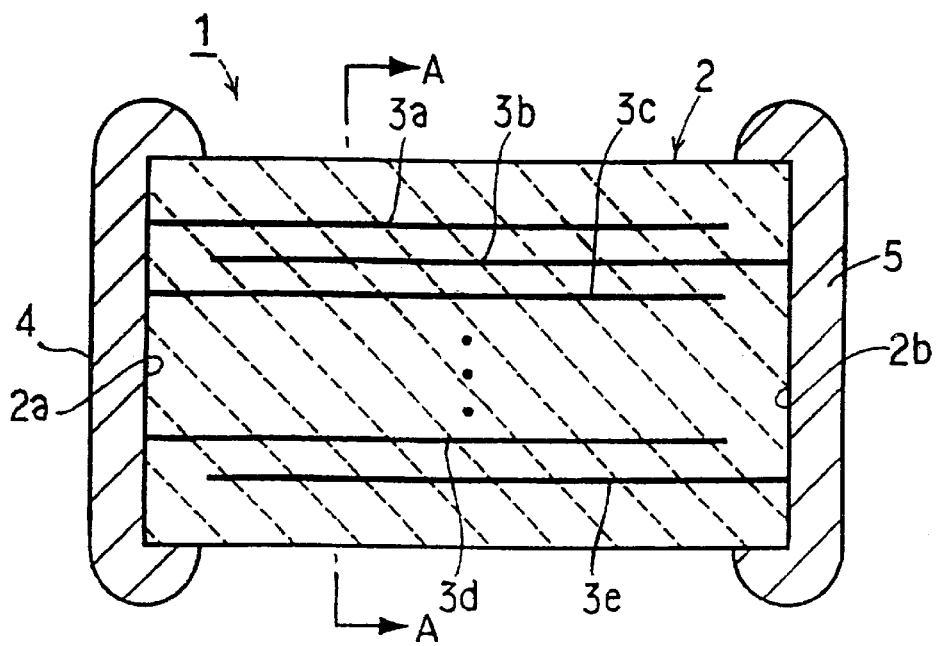
FIG. 1A is a cross-sectional view of a multilayer capacitor which is an electronic multilayer ceramic component according to an embodiment of the present invention.
Figure 1B:
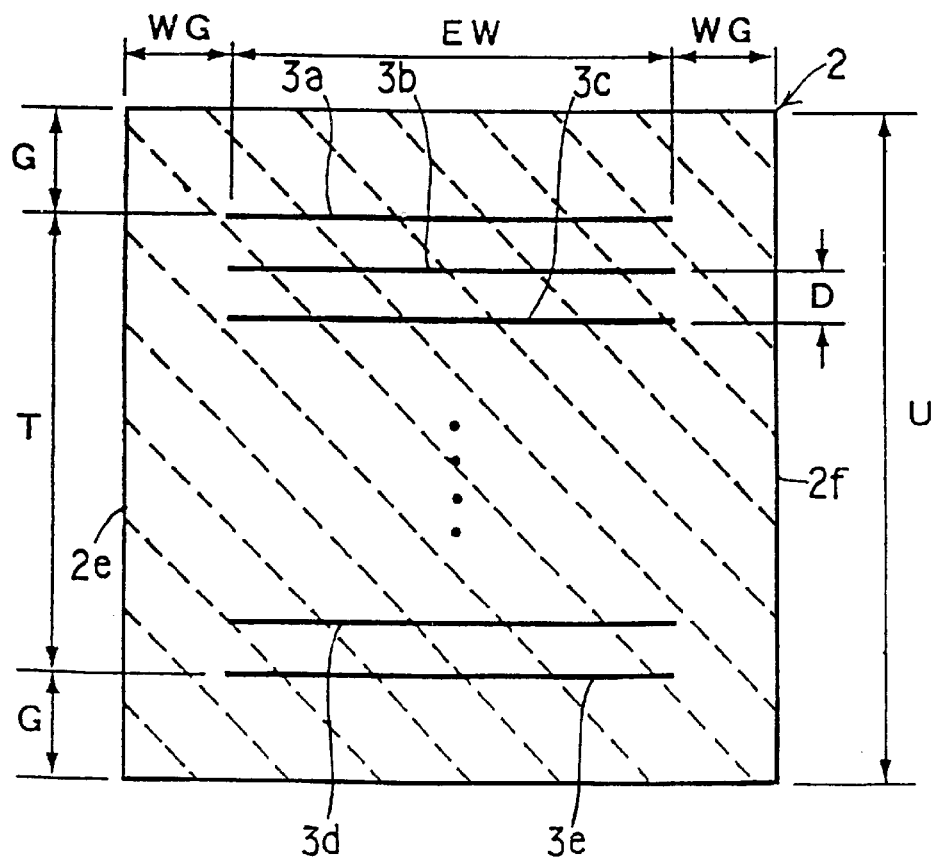
FIG. 1B is a cross-sectional view taken along line A—A of FIG. 1A.
Figure 2:
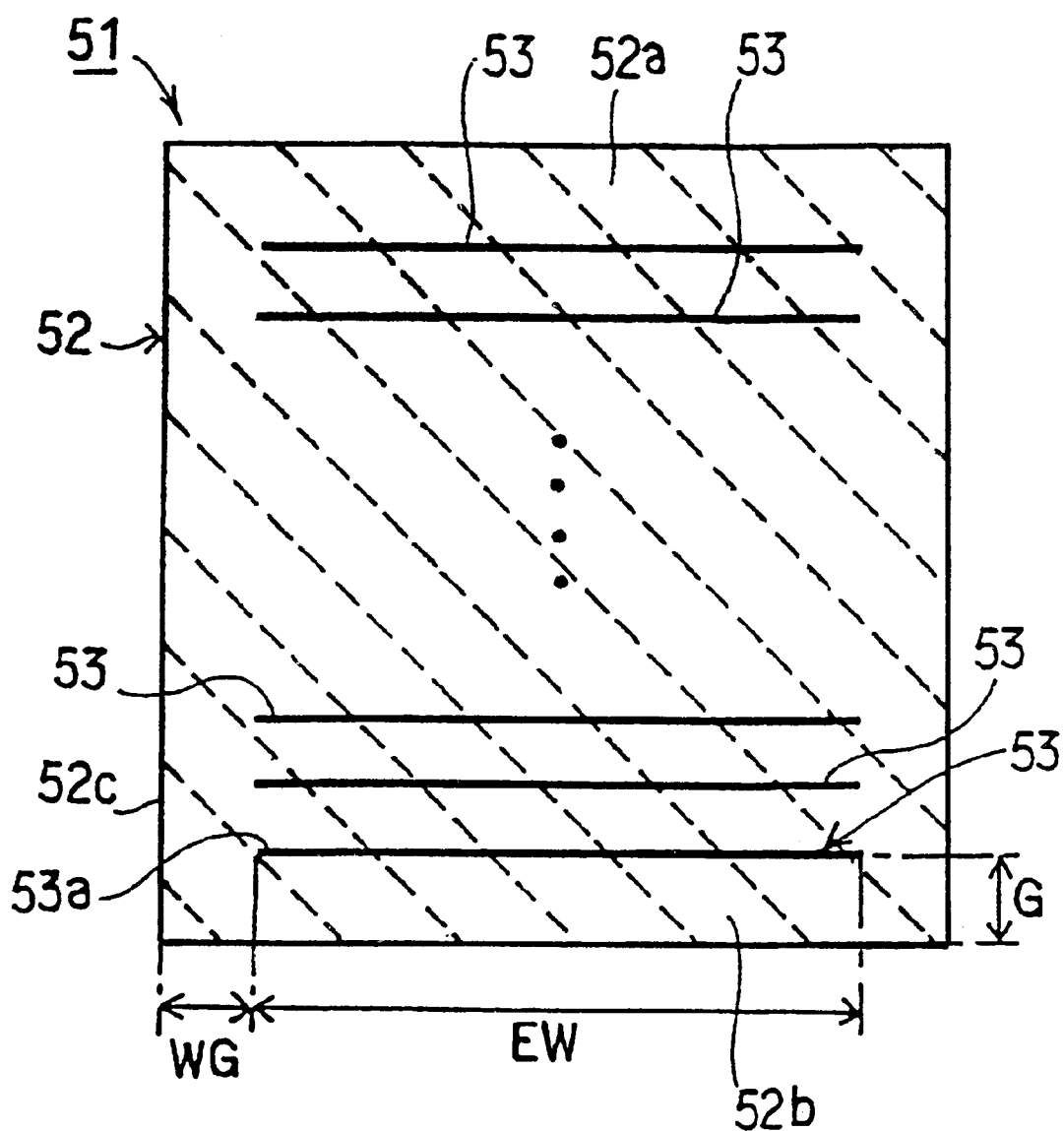
FIG. 2 is a cross-sectional view of a sintered ceramic block of a multilayer capacitor according to a conventional technique.

FIG. 1A is a cross-sectional view of a multilayer capacitor which is an electronic multilayer ceramic component according to an embodiment of the present invention. FIG. 1B is a cross-sectional view taken along line A—A of FIG. 1A.

In FIG. 1, a multilayer capacitor 1 includes a sintered ceramic block 2. The sintered ceramic block 2 is formed of a dielectric ceramic material such as barium titanate-based ceramic. A plurality of inner electrodes 3a–3e are disposed within the sintered ceramic block 2 wherein the inner electrodes 3a–3e overlap with one another in a thickness direction via ceramic layers. The plurality of inner electrodes 3a–3e alternately extend from a first end face 2a of the sintered ceramic block 2 or a second end face 2b toward the opposite end face but do not reach the opposite electrode. That is, each inner electrode extends starting from an end face opposite to an end face from which an inner electrode located at an immediately lower layer extends.

The sintered ceramic block 2 including the inner electrodes 3a–3e may be produced by multilayer capacitor production method known in the art.

The inner electrodes 3a–3e may be formed by baking a paste such as a Ag paste, Ag—Pd paste, or Ni paste.

A first outer electrode 4 and a second outer electrode 5 are formed such that the end faces 2a and 2b of the sintered ceramic block 2 are covered with the first and second outer electrodes 4 and 5, respectively. The outer electrodes 4 and 5 may be formed by means of coating and baking of a conductive paste. Alternatively, the outer electrodes 4 and 5 may be formed by means of evaporation, plating, or other techniques. Still, alternatively, the outer electrodes 4 and 5 may be produced in the form of a multilayer structure by first forming an electrode film by means of coating and baking of a conductive paste and then forming a plated layer thereon.

The multilayer capacitor 1 according to the present embodiment is characterized, as shown in FIG. 1B, in that when the width of the inner electrodes 3a–3e in the region in which the plurality of inner electrodes 3a–3e are laminated via ceramic layers is denoted by EW, the width of a side gap region between ends of the inner electrodes 3a–3e and one of side faces 2e and 2f of the sintered ceramic block 2 is denoted by WG, the thickness of a region in which the plurality of inner electrodes 3a–3e are laminated via ceramic layers is denoted by T, and the thickness of one of the outermost ceramic layers parallel to the plurality of inner electrodes and located outside the region in which the plurality of inner electrodes are laminated via ceramic layers is denoted by G, the following conditions are satisfied: $WG/EW \geq 0.3$, and $T/G \leq 7.0$.

In the multilayer capacitor 1 according to the present embodiment, because $WG/EW \geq 0.3$ and $T/G \leq 7.0$, the multilayer capacitor 1 is less susceptible to having a crack or delamination after the baking process for sintering into the ceramic block 2 even when the sintered ceramic block 2 has a very small size such as 1.6 mm in length, 1.6 mm in width, and 0.8 mm in thickness or less. Furthermore, the multilayer capacitor 1 is less susceptible to having a crack or delamination in a thermal shock test. That is, the multilayer capacitor 1 has high reliability. The present embodiment is described in further detail below with reference to specific experimental examples.

EXPERIMENTAL EXAMPLE 1

Sintered ceramic blocks 2 formed of barium titanate-based dielectric ceramic with a length of 1.6 mm, a width of 0.8 mm, and a thickness of 0.8 mm were prepared, wherein inner electrodes 3a–3e in each sintered ceramic block 2 were formed of Ni. Herein, the number of inner electrode layers was set to 120 to 170, and the distance D between adjacent inner electrodes (FIG. 1B) was set to 3.0 $\mu$m. A Cu paste was coated on both end faces of the sintered ceramic block 2 and then baked, thereby forming outer electrodes 4 and 5. In the above process, the ratio WG/EW and the ratio T/G were set to various values as shown in Table 1 thereby obtaining multilayer capacitors 1.

The multilayer capacitors 1 produced in the above-described manner were subjected to (1) a humidity load test (reliability test) and (2) a thermal shock test, and the results were analyzed as described below.

(1) Humidity load test (reliability test) The multilayer capacitors were maintained in an atmosphere of 100% relative humidity at 130° C. After that, the insulation resistance was measured. Those samples having an insulation resistance less than $10^9$ $\Omega$ were regarded as failed.

(2) Thermal shock test The multilayer capacitors were put into a solder bath maintained at 350° C. without preheating them and dipped therein for 3 sec. After that, the multilayer capacitors were taken out from the solder bath and observed via a microscope to determine whether cracking occurred in the sintered ceramic blocks.

The result is shown in Table 1.

TABLE 1

| SAMPLE TYPE | WG/EW | T/G | NUMBER OF FAILED SAMPLES IN HUMIDITY LOAD TEST | NUMBER OF FILES SAMPLES IN THERMAL SHOCK TEST |
| --- | --- | --- | --- | --- |
| 1 | 0.10 | 10.0 | 5/72 | 14/50 |
| 2 | 0.15 | 9.0 | 0/72 | 3/50 |
| 3 | 0.30 | 7.0 | 0/72 | 0/50 |
| 4 | 0.50 | 5.0 | 0/72 | 0/50 |
| 5 | 0.70 | 3.0 | 0/72 | 0/50 |

As can be seen from Table 1, in the multilayer capacitors of type 1 with WG/EW=0.10 and T/G=10.0, a considerably large relative number of samples failed to pass the humidity load test and the thermal shock test.

All multilayer capacitors of type 2 with WG/EW=0.15 and T/G=9.0 passed the humidity load test. However, some of them failed to pass the thermal shock test.

On the other hand, all multilayer capacitors of types 3 to 5, which fall within the scope of the present invention, passed both the humidity load test and the thermal shock test.

EXPERIMENTAL EXAMPLE 2

Multilayer capacitors of types 6–10 with various values of WG/EW and T/G shown in Table 2 were produced in the same manner as in Experimental Example 1 except that the outer size of sintered ceramic blocks were set to 1.0 mm in length, 0.5 mm in width, and 0.5 mm in thickness. The obtained multilayer capacitors were evaluated in the same manner as in Experimental Example 1. The result is shown in Table 2.

TABLE 2

| SAMPLE TYPE | WG/EW | T/G | NUMBER OF FAILED SAMPLES IN HUMIDITY LOAD TEST | NUMBER OF FILES SAMPLES IN THERMAL SHOCK TEST |
| --- | --- | --- | --- | --- |
| 6 | 0.10 | 10.0 | 4/72 | 10/50 |
| 7 | 0.15 | 9.0 | 0/72 | 2/50 |
| 8 | 0.30 | 7.0 | 0/72 | 0/50 |
| 9 | 0.50 | 5.0 | 0/72 | 0/50 |
| 10 | 0.70 | 3.0 | 0/72 | 0/50 |

As can be seen from Table 2, a considerably large relative number of multilayer capacitors of type 6 with WG/EW=0.10 and T/G=10.0 failed to pass the humidity load test and the thermal shock test. All multilayer capacitors of type 2 with WG/EW=0.15 and T/G=9.0 passed the humidity load test. However, some of them failed to pass the thermal shock test.

On the other hand, all multilayer capacitors of types 8 to 10, which fall within the scope of the present invention, passed both the humidity load test and the thermal shock test.

From the results shown in Tables 1 and 2, it can be seen that multilayer capacitors having high performance in both thermal shock resistance and reliability can be realized for both sizes 1.6 mm×0.8 mm×0.8 mm and 1.0 mm×0.5 mm×0.5 mm, if the ratio WG/EW is set to 0.3 or greater and the ratio T/G is set to 7.0 or smaller according to the present invention.

The reliability and the thermal shock resistance become high with increasing ratio WG/WE, that is, increasing ratio of the side gap width to the width of inner electrodes, and thus there is no upper limit in ratio WG/EW to achieve the objects of the present invention. However, the increase in WG/EW results in an increase in the width of the sintered ceramic block of multilayer capacitor. Thus, in order to meet the requirement for smaller sizes, it is desirable that WG/EW be selected to be equal to or less than 1.1.

The present invention has been described above with reference to multilayer capacitors. The present invention is also applicable to a wide variety of other electronic multilayer ceramic components having a sintered ceramic block in which a plurality of inner electrodes and ceramic layers are laminated via ceramic layers. Some examples of such components are multilayer varistors and multilayer thermistors.

As can be understood from the above description, the present invention has great advantages. That is, in the electronic multilayer ceramic component according to the present invention, the ratio WG/EW is selected to be equal to or greater than 0.3 and the ratio T/G is selected to be equal to or smaller than 7.0, thereby reducing the stress which occurs, when subjected to a thermal shock, due to the difference in thermal expansion coefficient between the inner electrodes and the ceramic, and thus enhancing the thermal shock resistance and reliability even in the case where the sintered ceramic block has a reduced size. Thus, the electronic multilayer component according to the present invention is less susceptible to having a crack or delamination and has excellent reliability.

In the present invention, as described above, because the thermal shock resistance and the reliability are enhanced by setting the ratio WG/EW to a value equal to or greater than 0.3 and the ratio T/G to a value equal or smaller than 7.0, it becomes possible to realize an electronic multilayer ceramic component having higher thermal shock resistance and higher reliability than can be achieved by conventional techniques, even when a sintered ceramic block having a very small size such as 1.6 mm in length, 0.8 mm in width, and 0.8 mm in thickness, or less, is employed.

According to a preferable aspect of the present invention, the above-described sintered ceramic block is made of a dielectric ceramic material, which makes it possible to realize a ceramic capacitor having high thermal shock resistance, high humidity resistance, and high reliability.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electronic multilayer ceramic component comprising:

a sintered ceramic block having a first end face, a second end face, upper and lower surfaces connecting said first and second end faces to each other, and a pair of side faces;

a plurality of inner electrodes disposed in the sintered ceramic block such that said plurality of inner electrodes overlap, in a thickness direction, with one another via ceramic layers and such that each said inner electrode extends from said first end face toward said second end face but not reaching said second end face or from said second end face toward said first end face but not reaching said first end face; and a first outer electrode and a second outer electrode formed such that said first and second end faces are covered with said first and second outer electrodes, respectively;

wherein, when the width of the region in which said plurality of inner electrodes are disposed such that said inner electrodes overlap in the thickness direction with one another via ceramic layers is denoted by EW, the width of a side gap region between ends of said inner electrodes and one of side faces of said sintered ceramic block is denoted by WG, the thickness of a region in which said plurality of inner electrodes are disposed such that said inner electrodes overlap in the thickness direction with one another via ceramic layers is denoted by T, and the thickness of one of the outermost ceramic layers parallel to said plurality of inner electrodes and located outside the region in which said plurality of inner electrodes are disposed such that said inner electrodes overlap in the thickness direction with one another via ceramic layers is denoted by G, the following conditions are satisfied:

WG (the width of the side gap region between the ends of the inner electrodes and one of the side faces)/EW≧0.3, and T/G (the thickness of the one outermost ceramic layer)≦7.0.

2. An electronic multilayer ceramic component according to claim 1, wherein said sintered ceramic block has a size equal to or less than 1.6 mm in length, 0.8 mm in width, and 0.8 mm in thickness.

3. An electronic multilayer ceramic component according to claim 1 or 2, wherein said sintered ceramic block is made of a dielectric ceramic material and wherein a multilayer capacitor is formed.

4. An electronic multilayer ceramic component according to claim 3, wherein said dielectric ceramic material is a barium-titanic-based ceramic layer.

5. An electronic multilayer ceramic component according to claim 1 or 2, wherein the thickness of each outermost ceramic layer is G.

* * * * *

(12) INTER PARTES REEXAMINATION CERTIFICATE (463rd)
United States Patent
Sekidou et al.

(10) Number: US 6,377,439 C1
(45) Certificate Issued: Oct. 4, 2012

(54) ELECTRONIC MULTILAYER CERAMIC COMPONENT

(75) Inventors: Hiroshi Sekidou, Takefu (JP); Yoshikazu Takagi, Sabae (JP); Yasunobu Yoneda, Takefu (JP)

(73) Assignee: Murata Manufacturing Co., Ltd., Nagaokakyo-Shi, Kyoto-Fu (JP)

Reexamination Request:
No. 95/001,267, Nov. 18, 2009
No. 90/010,861, Feb. 12, 2010

Reexamination Certificate for:
Patent No.: 6,377,439
Issued: Apr. 23, 2002
Appl. No.: 09/615,651
Filed: Jul. 13, 2000

(30) Foreign Application Priority Data

Jul. 15, 1999 (JP) .................................. 11-202039

(51) Int. Cl.
*H01G 4/12* (2006.01)
*H01G 4/005* (2006.01)
*H01G 4/30* (2006.01)

(52) U.S. Cl. .................. 361/303; 361/306.3; 361/321.2; 428/210

(58) Field of Classification Search .................. None
See application file for complete search history.

(56) References Cited

To view the complete listing of prior art documents cited during the proceeding for Reexamination Control Numbers 95/001,267 and 90/010,861, please refer to the USPTO's public Patent Application Information Retrieval (PAIR) system under the Display References tab.

*Primary Examiner* — Alan Diamond

(57) ABSTRACT

An electronic multilayer ceramic component is disclosed which is less susceptible to having a crack or delamination in a sintered ceramic block and has high thermal shock resistance, high humidity resistance, and high reliability. Dimensional parameters EW, WG, T, and G of the electronic multilayer ceramic component are determined such that the following conditions are satisfied: $WG/EW \geq 0.3$; and $T/G \leq 7.0$, where EW is the width of inner electrodes, WG is the width of a side gap region between the ends of the inner electrodes and one of side faces of a sintered ceramic block, T is the thickness of a region in which the plurality of inner electrodes are laminated, and G is the thickness of one of the outermost ceramic layers parallel to the plurality of inner electrodes and located outside the region in which the plurality of inner electrodes are laminated.

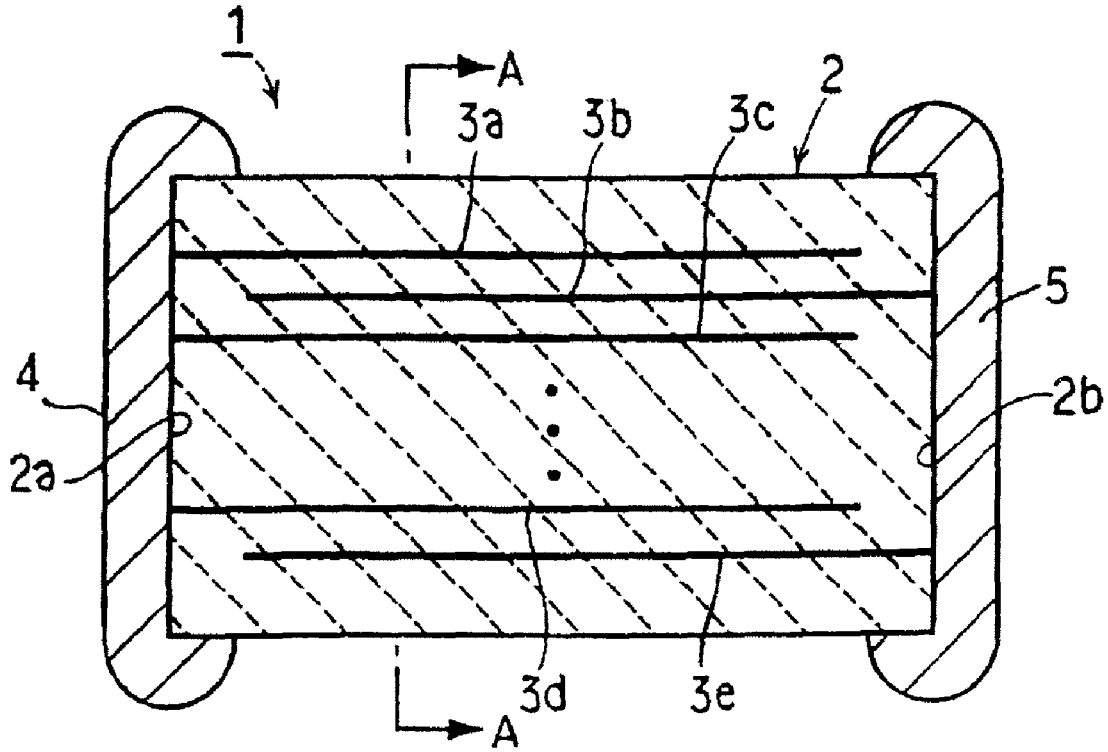

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-5 are cancelled.

* * * * *